United States Patent [19]
Mattison

[11] Patent Number: 4,600,419
[45] Date of Patent: Jul. 15, 1986

[54] HIGH EFFICIENCY, DOWN FLOW AIR FILTER SEALING AND SUPPORT SYSTEM

[75] Inventor: Allen H. Mattison, Weedsport, N.Y.

[73] Assignee: Cambridge Filter Corporation, Syracuse, N.Y.

[21] Appl. No.: 676,410

[22] Filed: Nov. 29, 1984

[51] Int. Cl.[4] .............................................. B01D 39/08
[52] U.S. Cl. ...................................... 55/484; 55/502; 55/506; 55/508; 55/DIG. 31
[58] Field of Search ................. 55/483, 484, 355, 495, 55/502, 506, 508, DIG. 31

[56] References Cited

U.S. PATENT DOCUMENTS

| | | | |
|---|---|---|---|
| 2,792,906 | 5/1957 | Evans | 55/DIG. 31 X |
| 2,935,157 | 5/1960 | First | 55/483 |
| 3,277,638 | 10/1966 | Soltis | 55/483 X |
| 3,360,910 | 1/1968 | Soltis | 55/483 |
| 3,552,104 | 1/1971 | Wood | 55/502 |
| 3,782,082 | 1/1974 | Smith et al. | 55/502 X |
| 3,884,662 | 5/1975 | Hladik | 55/502 X |
| 4,511,380 | 4/1985 | Fetter | 55/355 |

Primary Examiner—Charles Hart
Attorney, Agent, or Firm—Charles S. McGuire

[57] ABSTRACT

High efficiency air filters, including cores of pleated media sealed within a metal frame, are supported by parallel tracks suspended from overhead structure of an enclosed room. The filters are arranged both side-by-side and end-to-end in closely adjacent relation to present an essentially continuous, downwardly facing surface forming all or part of the overhead boundary of a space wherein downward, laminar air flow is provided. The filter units are sealed to one another, or to the adjacent walls, continuously around the periphery at the lower ends by caulking material which is injected from below into the spaces between the units to provide a totally sealed system, whereby the only path for air to enter the room is from above through the high efficiency filter media. The cooperating structure of the filter units and track system enables the units to be installed from below in a fast and easy manner and with minimal upward clearance as compared to prior arrangements wherein filter units are supported by structure suspended from above.

22 Claims, 12 Drawing Figures

HIGH EFFICIENCY, DOWN FLOW AIR FILTER SEALING AND SUPPORT SYSTEM

BACKGROUND OF THE INVENTION

The present invention relates to high efficiency air filtration systems, and more particularly to a system of suspended, mutually sealed filter units forming all or part of the ceiling or overhead boundary of a space into which filtered air is introduced by downward, laminar flow.

In locations requiring air substantially free of all foreign matter, such as for certain industrial process, pharmaceutical and medical applications, etc. it is a common practise to provide a plurality of filter units, comprising a core of pleated media sealed to a surrounding, box-like frame, resting upon or suspended from support structure to form all or a portion of the top of an enclosed space. Incoming air is distributed over the upstream sides of the filter units and flows downwardly through the media to the room or space. Each filter unit is sealed about its periphery to insure that only air which has passed through the high efficiency filter media reaches the room or space, commonly known as a "clean room", "clean tunnel" or "clean bench."

A number of means have previously been employed for preventing air leaks around or through the framing system which supports the filter units, or between the filter units and frame. Such means have included the use of mastic sealants at all seams and joints of the framing members, as well as gaskets between adjacent surfaces of the filter units and framing members. Other means directed to this purpose include framing systems wherein a latticework of upwardly directed, U-shaped channels contain a liquid wherein edge portions on each side of the filter units are disposed to provide a liquid seal about the filter units, such as disclosed in U.S. Pat. No. 3,486,311.

Another consideration in the design of overhead air filtration systems is the manner in which the individual filter units are installed upon the support structure. According to an installation system which has been widely used for some time, a gridwork of inverted T-bars is suspended from overhead structure to provide openings wherein the filter units are placed. In order to install an individual unit, it must be lifted endwise through the opening in the gridwork and then lowered onto the support structure. This requires considerable clearance between the gridwork and the overhead structure from which it is suspended, in addition to the inconvenience of physically lifting the entire filter unit through the opening to a position entirely above the support structure before being lowered into place.

It is a principal object of the present invention to provide a high efficiency air filtration system forming all or a part of the ceiling of a "clean room," or the like, having novel and improved sealing means to prevent air leaks around the individual filter units.

Another object is to provide a unique and improved downflow air filtration system wherein there is no leakage of unfiltered air around the individual filter units, although the latter are not required to be sealed in air tight engagement with the framing members by which they are supported.

A further object is to provide air filter units wherein a conventional filter core of pleated, high efficiency media is surrounded by a metal frame of unique construction permitting suspension of the units in side-by-side relation from a gridwork of tracks and the sealing of adjacent units to one another rather than to the support structure.

Still another object is to provide an air filter construction and support structure therefor in a downflow filter installation which permit the filter units to be positioned and installed in a simple and rapid manner.

A still further object is to provide a downflow air filter unit which may be installed with minimal vertical clearance above the structure by which the filter unit is supported.

Other objects will in part be obvious and will in part appear hereinafter.

SUMMARY OF THE INVENTION

As will be apparent from the following detailed description, the foregoing objects are achieved by a filter construction wherein the core of pleated media is enclosed on four sides by side and end frame members or casings of special design to which the media is sealed in air-tight engagement. The side casings are in the form of shallow, pan-like structures fabricated from sheet metal in the manner of the filter frames disclosed in U.S. application Ser. No. 573,620, filed Jan. 25, 1984 and assigned to applicant's assignee. The end casings of the present invention are preferably formed as aluminum extrusions and include structure cooperating with the side casings in the assembled condition of the individual filter units, as well as structure cooperating with the end casings of identical filter units supported in closely adjacent relation.

The filter units include outwardly and downwardly projecting flanges along one edge of the end casings providing a continuous lip along each end of the units, by which they are suspended from spaced, parallel tracks defining upwardly disposed, open channels wherein the end casing flanges are placed. The tracks are supported in properly spaced relation by threaded rods passing through openings in the track members and secured by nuts on the top and bottom. The rods are suspended by any convenient means from superstructure above the clean space wherein the filter units are installed. The configuration of the filter unit end casings and the track design permit the units to be installed from below with a vertical clearance above the tracks only as great as the height of the downwardly projecting flange on the end casings.

When all filter units are installed on the tracks, each of the units is immediately adjacent another on all four sides, except for those adjacent the walls of the room. Clearance spaces are provided between adjacent sides and ends of the adjoining filter units for injection of a caulking compound. A strip of sheet metal, or the like, of suitable size and configuration is attached in sealed engagement to each wall, extending therefrom to define a surface in closely spaced relation to the adjoining filter unit side or end surface. The caulking compound is applied continuously between the wall-attached strips and filter units which, together with the continuous caulking between all adjacent filter units, provides a totally sealed system wherein the only path for air into the clean space is through the filter media from the space above the filter units, which is maintained at a pressure higher than that of the space below. The caulking lines may be covered by trim strips to enhance the appearance from below, if desired.

BRIEF DESCRIPTION OF THE DRAWING

FIG. 1a is an enlarged, end elevational view of a portion of one of the filter unit elements shown in FIG. 1;

DETAILED DESCRIPTION

Figure 1:
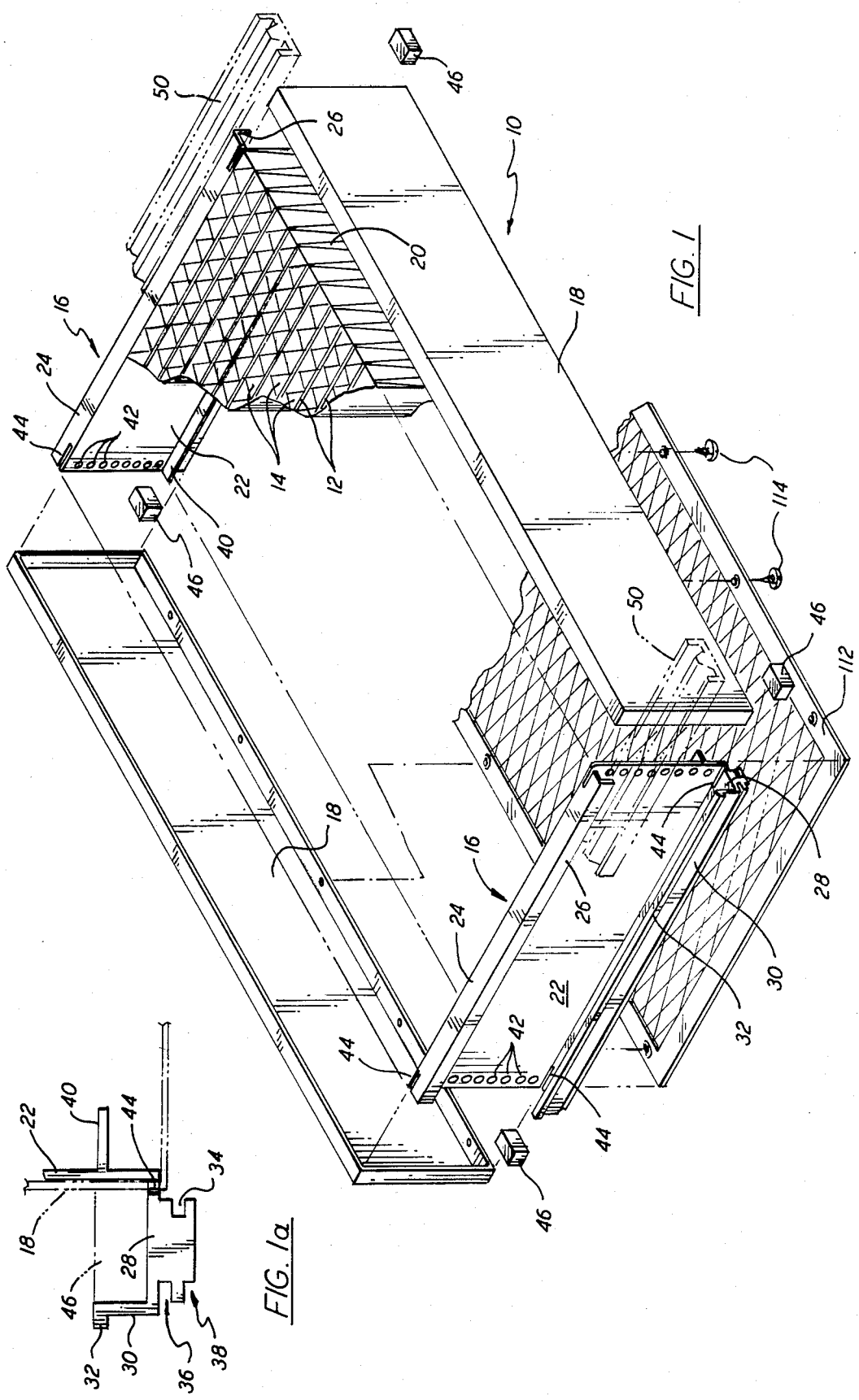
FIG. 1 is an exploded perspective view of an air filter unit constructed in accordance with the present invention, also showing in phantom lines fragments of a track system by which such units are supported.

Referring now to the drawings, in FIG. 1 is shown an air filter unit, designated generally by reference numeral 10, including a core of zig-zag folded, continuous sheet 12 of high-efficiency filter media and corrugated spacers 14 placed between the walls of each pleat in the media, and a rigid, box-like frame comprising end casings 16 and side casings 18. The filter core is entirely conventional, both in configuration and materials, as is the manner of sealing it to the frame, which includes totally embedding both zig-zag media edges, a portion of one of which is seen in FIG. 1 and denoted by reference numeral 20, in a layer of adhesive material in each of side casings 18, and sealing the media end panels to the inner surfaces of end casings 16 by a continuous bead of adhesive. In this regard, reference may be made to U.S. Pat. No. 4,227,953, also assigned to applicant's assignee, and to earlier mentioned application Ser. No. 573,620, the latter dealing specifically with the sealing of filter cores within sheet metal frames wherein the adhesive sealing material also serves as the sole means of retaining the frame members in assembled relation, which is the case in the filter unit of the present invention.

As mentioned before, side casings 18 are in the form of shallow, pan-like structures, comprising a flat, rectangular wall bounded on all four sides by side flanges which are formed integrally with and bent at 90° to the flat wall to join at liquid-tight corners. The structure of end casings 16 in the illustrated form is more complex, although such members may be, and preferably are, fabricated as aluminum extrusions. End casings 16 include rectangular wall portion 22 having flange members extending outwardly therefrom along both the upper and lower edges. The flange member along the upper edge (as shown in FIG. 1 and in the orientation of the filter units when installed and in use) includes first and second portions 24 and 26, extending outwardly and downwardly, respectively, with respect to wall 22. As better seen in FIG. 1a, the lower flange member includes outwardly and upwardly extending portions 28 and 30, respectively, the latter further including an outwardly extending lip 32. Outwardly extending portion 28 is formed in a lower area with inwardly and outwardly facing recesses 34 and 36, respectively, along the length thereof, as well as groove 38 along the outer, lower edge.

On the inner surfaces, i.e., those to which the end walls of the filter core media are sealed, walls 22 may be provided with an inwardly extending flange 40. After the extruding operation and the cutting of end casings 16 to the desired lengths, a plurality of openings 42 are formed along the side edges of wall 22 and notches 44 are formed at both ends of flange portions 24 and 28 at the juncture thereof with wall 22. Notches 44 provide means for placing side casings 18 in mating engagement with end casings 16, as indicated in dot-dash lines in FIG. 1. When the end and side casings are so assembled, the edges of walls 22 which include openings 42 are inside the pan-like structure of side casings 18, as are zig-zag edges 20 of filter media 12, the media end panels having previously been sealed to walls 22. The edges of the filter core rest upon flanges 40 which thus serve to locate the core relative to the frame members. However, the filter core may be located relative to the frame without flanges if desired, whereby use of such flanges is entirely optional.

The filter unit is then positioned with one of side casings 18 resting upon a hotizontal surface and the pan-like structure is filled with an adhesive potting agent initially in liquid form to enclose completely the zig-zag edges of the media. When the adhesive has hardened sufficiently, the filter unit is inverted and the other side casing is filled with the adhesive material. Assembly of filter units 10 is then completed by securing blocks 46 by means such as a silicone sealant within the channels formed by the outer surface of the flange on side casing 18 and outwardly and upwardly extending portions 28 and 30, respectively, of the lower flange on end casings 16 at the four lower corners of filter units 10. This provides an essentially continuous surface along the lower part of each side of the filter casing, for purposes to be described later.

Figure 2:
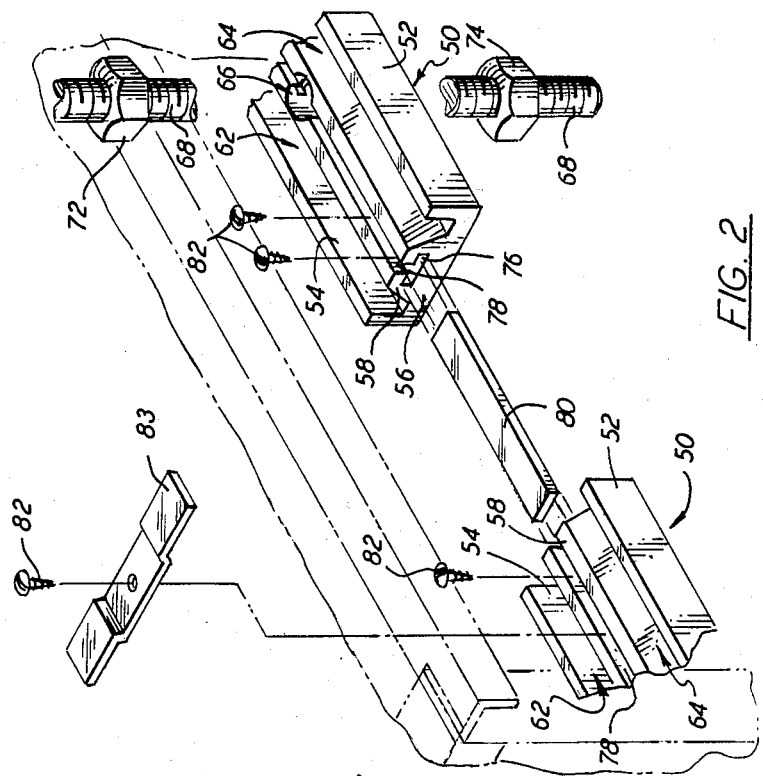
FIG. 2 is an enlarged, fragmentary, perspective view of one of the support tracks for the filter units of FIG. 1.

Filter units 10 are supported by a system of suspended tracks having upwardly-facing channels and extending in parallel relation at regularly spaced intervals across the room wherein the filter units are installed. The track members are designated generally by reference numeral 50, a pair of such track members being shown in phantom lines in FIG. 1 extending along each end of filter unit 10. Constructional details of the track members and their relationship to the filter units in the installed condition may be seen more clearly with reference to FIGS. 2 and 3. Track members 50 are preferably formed as elongated, aluminum extrusions, cut to desired lengths, each having a pair of outer walls 52 and 54, joined by a bottom wall 56 with medial portion 58 extending upwardly therefrom midway between the outer walls. A pair of upwardly facing channels 62 and 64 are thus provided between medial portion 58 and outer walls 52 and 54.

At spaced intervals along track members 50, openings 66 are provided, extending through medial portion 58 and bottom wall 56, for passage of threaded members 68 which are fixedly attached at their upper ends (not shown) in any convenient manner from structure above the space wherein the filter units are installed. Cross braces 70 may be provided to attach adjacant members 68 for added stability. Track members 50 are engaged between nuts 72 and 74 on threaded members 68, being thereby fixedly suspended in predetermined positions from the building structure. In order to provide track members 50 extending substantially fully across the upper part of a room of any given dimension, separate track members may be spliced in end-to-end relation. For this purpose, a continuous channel 76 and communicating slot 78 are formed in medial portion 58 of each track member 50. Splice bar 80 (FIG. 2) may be slid into channels 76 of adjacent track members 50 and secured by self-tapping set screws 82, threading into the walls of slots 78 and seating against splice bar 80. It may also be desirable in some cases to provide hold-down brackets 83, extending laterally across track members 50 and covering flange portions 24 of the filter units on each side of the track members. Brackets 83 are also secured by self-tapping screws 82 in slot 78.

In typical installations employing filter units 10, the entire top of an enclosed space is formed by the lower faces of the filter units, arranged in side-by-side and end-to-end manner. A complete track system is installed in the space suspended as previously described from the overhead structure, to provide parallel track members extending continuously between two opposite walls and laterally spaced by a predetermined distance related to the dimensions of filter units 10. Individual units are lifted into position and downwardly extending portions 26 of the flanges along the upper edges of end casings 16 are placed in upwardly facing channels 62 and 64 of adjacent track members as explained later in more detail, the units being shown in FIG. 3 in their installed positions.

Figure 4:
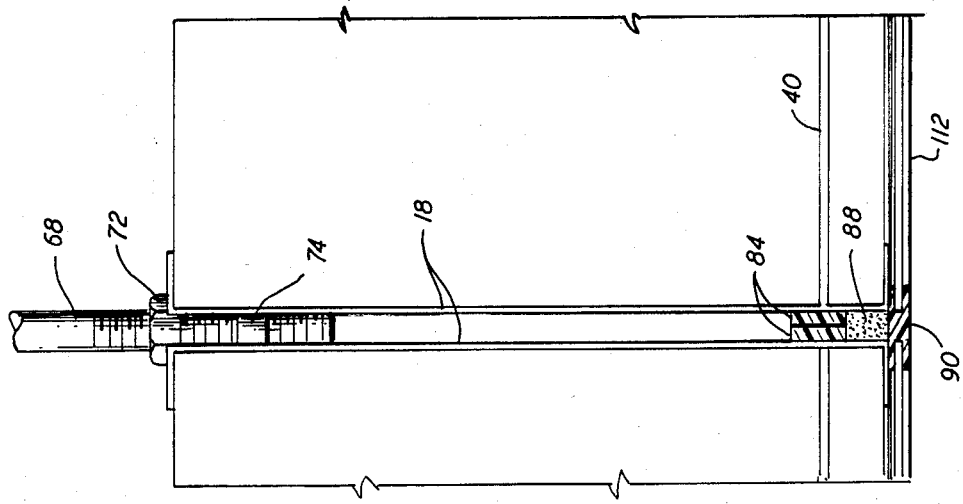
FIG. 4 is a fragmentary, end elevational view in vertical section of the supported filter units of FIG. 3.
Figure 3:
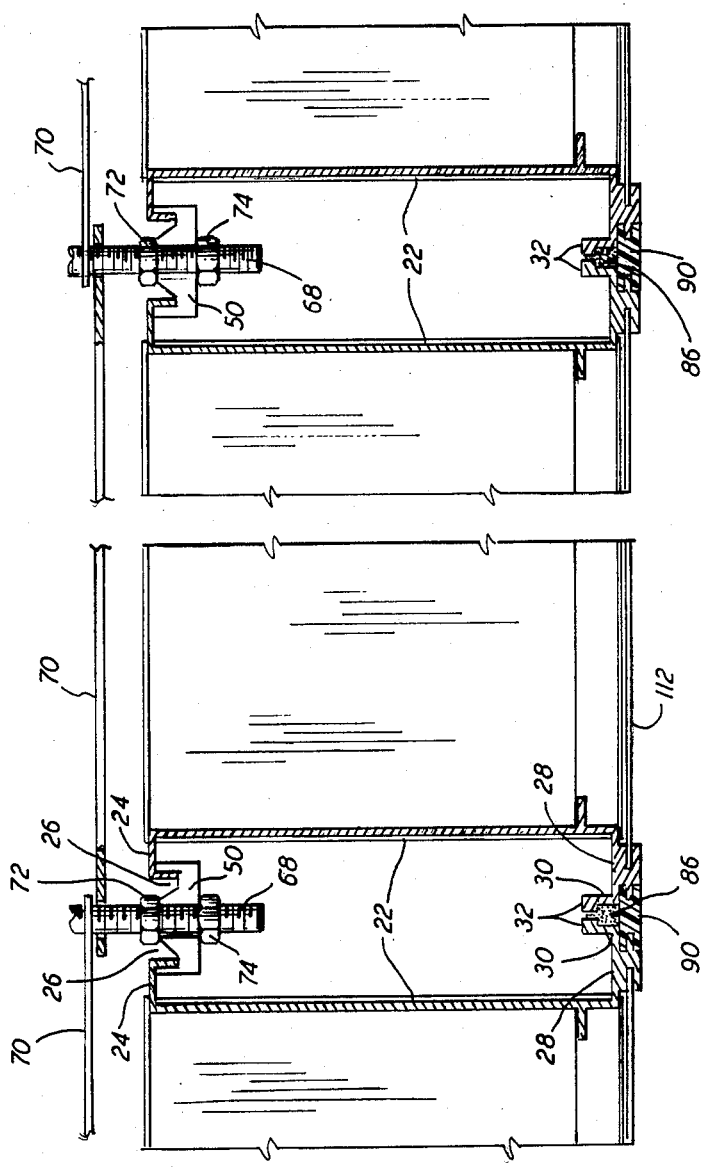
FIG. 3 is a fragmentary, side elevational view in vertical section of a plurality of the filter units of FIG. 1 supported upon the tracks of FIG. 2.
Figure 5:
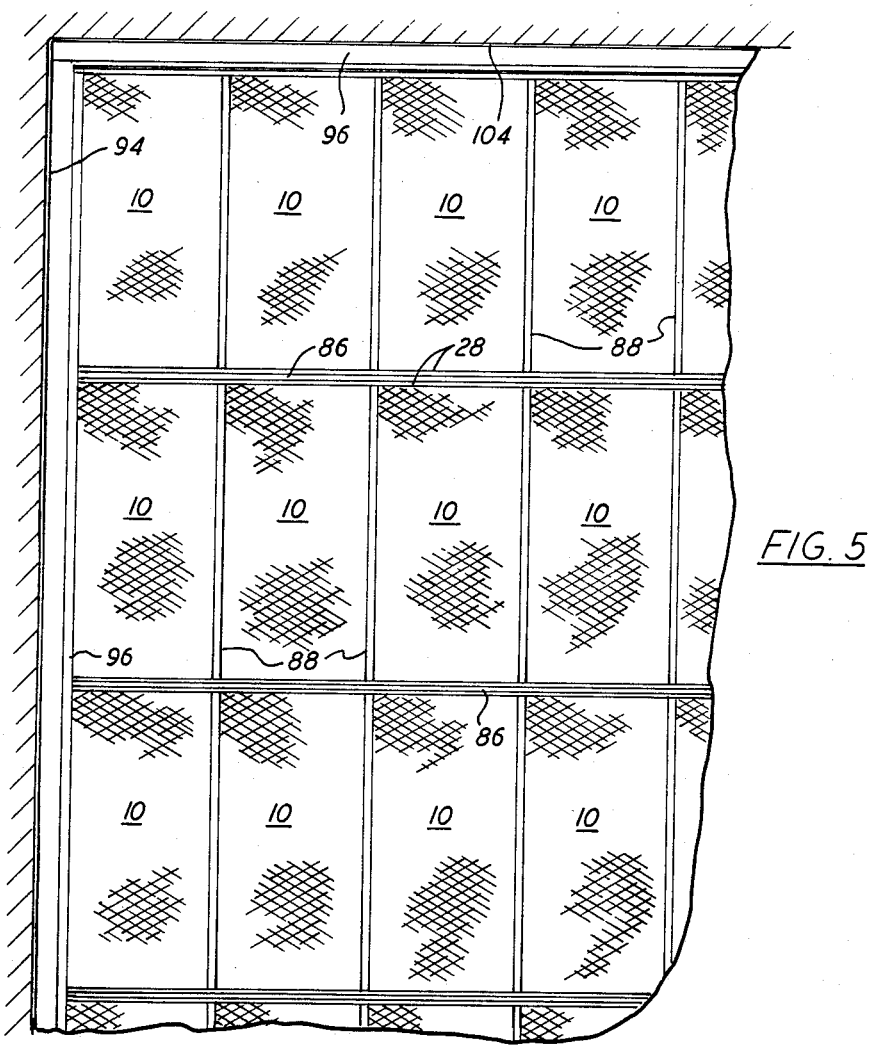
FIG. 5 is a fragmentary, plan view showing a portion of an installation of the filter units forming the ceiling of a room, as seen from below.

End casings 16 are so dimensioned that lips 32 on flange portions 30 of end-to-end adjacent units will be in contact, or in close proximity. The filter units are also installed in side-by-side proximity; the spacing between adjacent units may established by means such as outwardly protruding dimples (not shown) on side casings 18. After installation of as many filter units 10 as are required to fill the area above the clean space, except for spaces between the walls and the outer filter units, all adjacent units are sealed to one another on all four sides. This is accomplished according to the present invention by applying from below a continuous layer of caulking material in the spaces between flange portions 30 of end-adjacent units and in the spaces between the lower portions of the outer surfaces of side casings 18. Backer strips 84 provide an inner limit for insertion of the caulking material into the spaces between side-adjacent units. The caulking material may be of any suitable, commercially available type. The caulking lines between end-adjacent units are indicated in FIGS. 3 and 5 by reference numeral 86 and the caulking lines between side-adjacent units by reference numeral 88 in FIGS. 4 and 5.

After the caulking material has been applied, trim strips 90 may be affixed between the lower edges of filter units 10 to cover the caulking lines. As shown in FIGS. 3 and 4, trim strips 90 are of generally I-shaped cross section, comprising elongated extrusions of a flexible material. The strips inserted between adjacent end casings 16 are attached by placing one of the legs or flanges on each side of the strip in recess 36 (FIG. 1a) of the respective adjacent lower flange portions of each end casing. The other of the legs of trim strips 90 will then be seated in groove 38 of the end casing lower flange portions. In FIG. 5 the caulking lines are visible, i.e., are not covered by trim strips 90. The trim strips extending in one direction, e.g., those covering the caulking lines between end casings 16, may extend continuously across the room if of sufficient length, while those extending in the other direction (between side casings 18) would be cut to the same length as filter units 10. It should be noted that the trim strips do not serve any sealing function, being provided only for the purpose of improving the appearance of the face of the filter array as seen from below, and their use is entirely optional. If trim strips are not to be used, the configuration of the lower flange portions may be modified to omit the recesses provided for mounting such strips.

Figure 6:
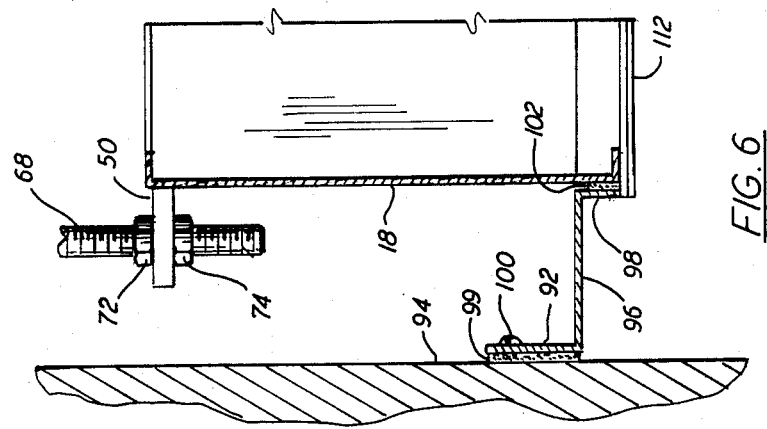
FIG. 6 is a fragmentary, end elevational view showing structure by which the sides of the filter units are sealed to the adjacent walls.
Figure 7:
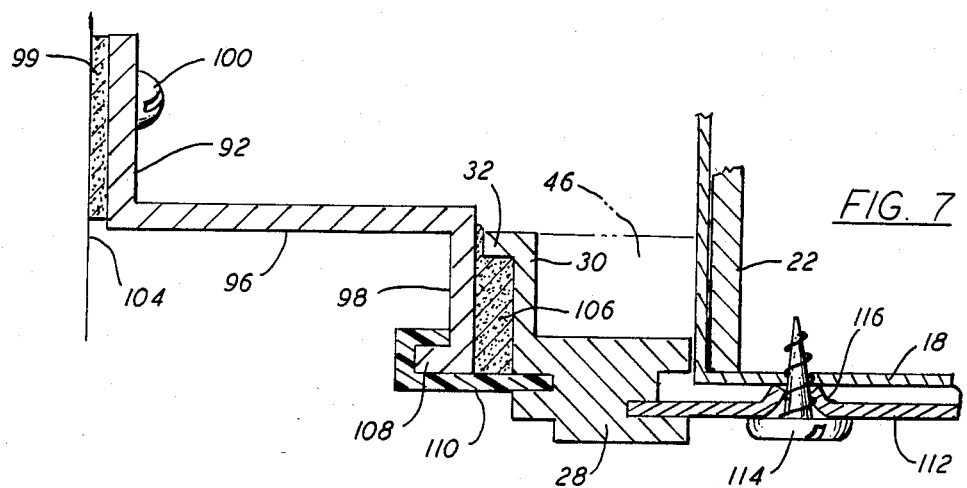
FIG. 7 is a fragmentary, side elevational view showing means for sealing the ends of the filter units to adjacent wall surfaces.

The filter units adjacent the walls of the room are sealed thereto by supplemental structure as indicated in FIGS. 6 and 7. For those filter units 10 having one of side casings 18 facing a wall surface, shown in FIG. 6, a sheet metal element is bent to have a first portion 92 for sealed engagement with wall surface 94, a second portion 96 extending between the wall surface and filter unit, and a third portion 98 providing a surface for sealed engagement with the adjacent surface of side casing 18. Portion 92 is sealed to wall surface 94 by a suitable sealant 99 and secured by screws 100. Portion 98 is sealed to side casing 18 by caulking material 102, applied continuously between the opposing surfaces in the same manner as the caulking lines between adjacent filter units.

In FIG. 7 is illustrated the preferred means of sealing end casings 16 to adjacent wall surface 104. A sheet metal member essentially the same as that shown in FIG. 6 is employed, having portions identified by the same reference numerals, 92, 96 and 98, and sealed to the wall surface by sealant 99. Caulking material 106 is applied between the facing surfaces of portion 98 and portion 30 of the lower flange member of end casing 16. If desired, lip 108 may be formed along the lower edge of portion 98 of the sheet metal member, and flexible trim strip 110 of generally J-shaped cross section may be placed around lip 108 and have one edge inserted in recess 36 of the lower flange member to cover caulking material 106. This could also be done, of course, with the adjoining sheet metal members and side casings 18 of FIG. 6, but again, the use of such trim strips is optional. The sheet metal members for sealing both the sides and ends of the filter units to the adjacent wall surfaces are fabricated for each installation to provide portions 96 of proper length for the particular room wherein the filter units are installed.

In further accordance with conventional practise, the lower faces of the filter cores are covered by screens 112, normally in the form of open meshwork surrounded by a solid frame, the entire structure being formed of an integral piece of aluminum sheet. Screen 112 is secured to the filter frame by screws 114, extending through openings in the screen frame and self-tapping into openings in the lower flange portions of side casings 18. When the openings are punched or otherwise formed in the screen frame, raised portions 116 are thereby provided around each opening and serve to space the screen from side casings 18 when secured thereto, as best seen in FIG. 7. Opposite edges of screen 112 are disposed in recesses 34 of the lower flange members of end casings 16.

Figure 8:
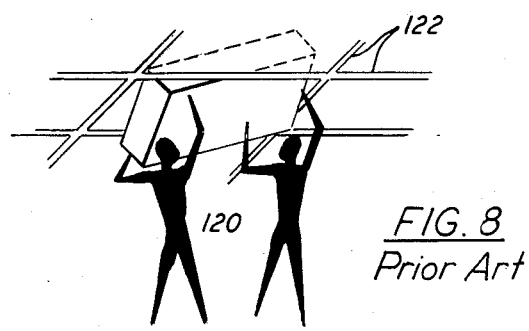
FIG. 8 is a somewhat diagrammatic, perspective illustration of a common prior art means of installing downflow filter units.

Turning now to FIGS. 8 and 9a–9c, the manner of installation of a typical prior art downflow filter unit 5 will be contrasted with installation of the filter units upon the track system of the present invention. As shown in FIG. 8, the usual practice has been to install a gridwork of perpendicular frame members 122 defining rectangular openings of somewhat smaller dimensions than the outside length and width of filter units 120 to be supported thereon. Frame members 122 are normally lengths of so-called T-bar suspended by support wires from overhead structure and installed in accordance with standard building codes. Since the outer dimensions of filter units 120 are larger than the openings in T-bar gridwork 122, the filter units must be tilted and lifted from below through the girdwork openings, as illustrated in FIG. 8. After the filter unit has passed through the opening and is positioned entirely above the gridwork, it is lowered into position with peripheral, lower edge portions of the filter unit resting upon the T-bars. Obviously, this requires a free space above the level of the T-bars significantly greater than depth (i.e., the installed height) of the filter units.

Figure 9A:
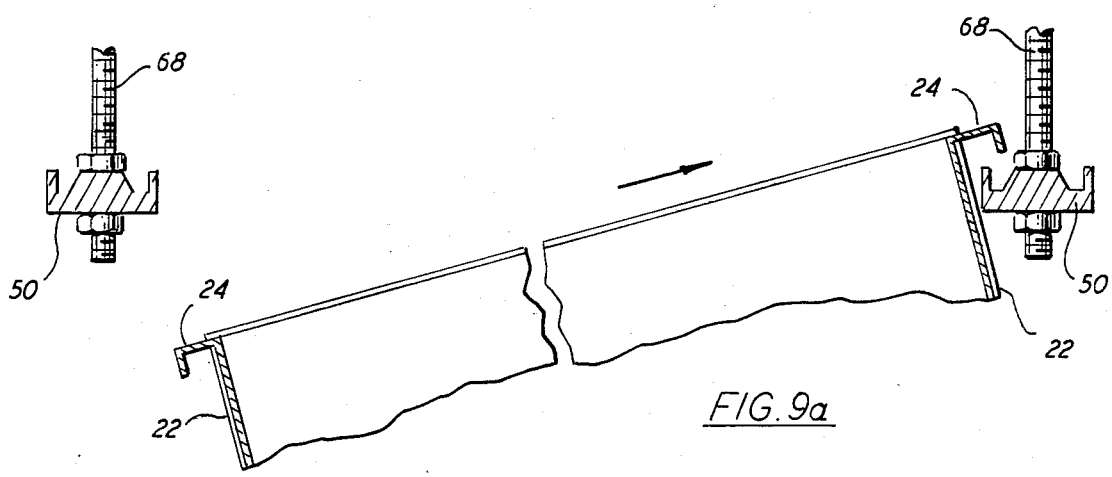
FIGS. 9a, 9b and 9c are a series of fragmentary, side elevational views of a filter unit and track system of the present invention showing the manner of filter unit installation.
Figure 9B:
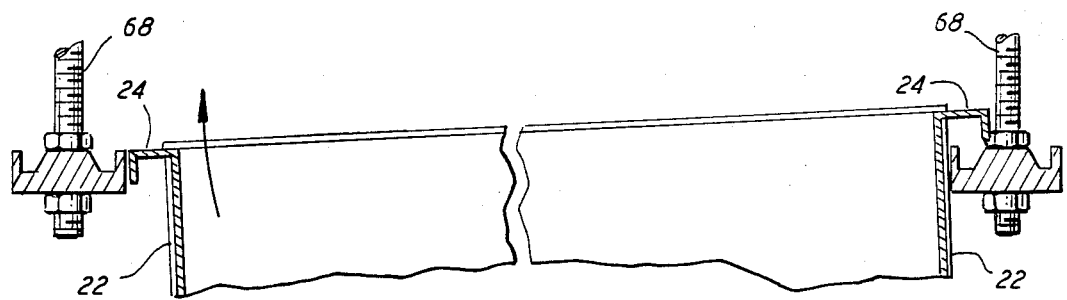
Figure 9C:
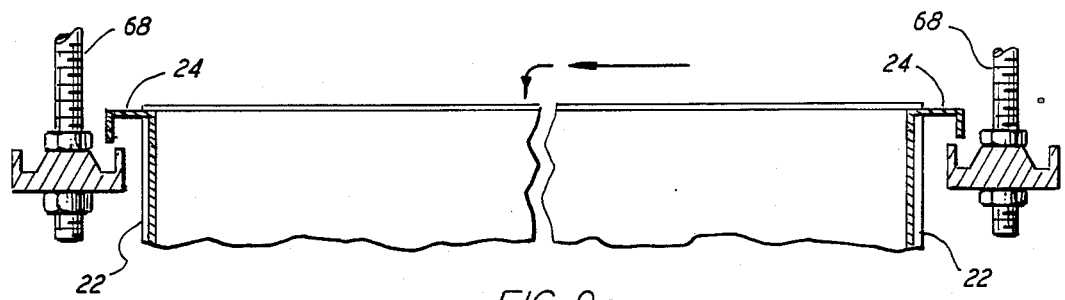

Installation of filter units 10 upon tracks 50 is performed in the manner illustrated in FIGS. 9a–9c. Tracks 50 are attached to bolts 68, as previously mentioned, which in turn are suspended in any convenient manner from overhead building structure to provide a plurality of parallel track members having the required spacing above the space to which filtered air is to be supplied. The filter units are tilted and lifted from below until the flange portion at the upper edge of wall 22 of the end casing at the upwardly tilted end clears the edge of track member 50 upon which it is to be supported, and the filter unit is then moved in the direction of the arrow in FIG. 9a to the position illustrated therein. The other end of the filter unit may then be swung upwardly, as indicated by the arrow in FIG. 9b, and the flange member at the upper edge thereof will clear the adjacent track member due to the lateral positioning of the filter unit.

When the flange members at the upper edges of both side casings are positioned above the track members on both sides, the filter unit is moved laterally, as indicated by the straight portion of the arrow in FIG. 9c until the downwardly extending portions of the flange members are positioned above the upwardly facing channels of the track members. The filter unit may then be lowered, as indicated by the curved portion of the arrow in FIG. 9c, and will be supported upon the track members as shown and previously described in connection with FIG. 3. It is thus apparent that according to the present invention the filter units may be installed upon the track members with a vertical clearance of not more than a few inches at most, whereas typical prior art downflow filter systems require a much larger clearance above the supporting frame members or gridwork for installation of the filter units from below. This is a decided advantage since a large vertical clearance is not avialable in many installations.

It may thus be seen that the invention provides air filter units suitable for installation in a room to form all or part of the ceiling thereof, permitting downward flow of air from a space above the filter units to a clean space below. The filter units may be installed quickly, and with minimal overhead clearance, simply by placing flange portions thereof in upwardly facing channels in a system of parallel track members suspended from overhead structure. All air entering the room must pass through the high-efficiency media of the filter core since the filter casings or frames are all sealed to one another, or to the adjacent wall structure by means of caulking material applied from below by means of conventional caulking guns, or the like. If an individual filter unit develops a leak, or requires replacement for any other reason, the caulking material on all four sides of such filter unit may be cut, the damaged filter unit removed and a new filter unit installed in its place and sealed by caulking on the four sides in the manner previously described. In the event that the entire overhead surface of the clean space is not required, or not desired to be made up of the described filter units, other structure of the proper dimensions may be substituted therefor. That is, box-like units which may contain other components such as lights or sprinklers, for example, or simply hollow "blank-off" units may be suspended from the track system in place of one or more filter units and sealed on all sides in the manner described by the caulking material.

What is claimed is:

1. An assembly of high efficiency air filter units through which essentially all air entering a clean space below said units must pass to remove particulate matter down to sub-micron size from said air, said assembly comprising:
   (a) a plurality of air filter units each having a filter core of pleated media sealed in air-tight engagement on four sides to a surrounding, box-like, rigid frame, having side and end members;
   (b) means for supporting said filter units adjacent the upper surfaces thereof from structure above said space with adjacent units having said side and end members thereof providing adjoining vertical surfaces in closely spaced relation with the lower surfaces of said units in essentially the same horizontal plane to form at least a portion of the top of said space; and
   (c) a caulking material filling all spaces between said adjoining vertical surfaces of adjacent filter units, effectively sealing said spaces and providing the sole means preventing passage of air around said units.

2. The invention according to claim 1 wherein said end members include structure adjacent the portion bordering the upstream side of said units for resting upon said supporting means.

3. The invention according to claim 2 wherein said end member structure comprises a flange member extending outwardly and downwardly from said end member portion bordering said upstream side of said units.

4. The invention according to claim 3 wherein said flange member extends substantially continuously across said end member from side to side.

5. The invention according to claim 4 wherein said end members further include secondary flange means extending outwardly from said end member portion bordering said downstream side of said units.

6. The invention according to claim 5 wherein said secondary flange means on end members of adjacent filter units provide cooperating structure limiting the extent of advancement of said caulking material when inserted from below in said spaces between said end members of adjacent units.

7. The invention according to claim 6 and further including an elongated backing strip of material affixed to and extending the entire length of each of said side member external surfaces, whereby said backing strip on the side members of adjacent filter units provide cooperating structure limiting the extent of advancement of said caulking material when inserted from below in said spaces between said side members of adjacent units.

8. The invention according to claim 7 and further including an elongated trim strip extending along said spaces between said sides and ends of adjacent filter units in covering relation to said caulking material rendering the latter non-visible from a position below said filter units.

9. The invention according to claim 8 wherein said secondary flange means provide structure for supporting said trim strips between said end members of adjacent filter units.

10. The invention according to claim 7 and further including an open grillework screen affixed to said filter unit in covering relation to said downstream side of said units.

11. The invention according to claim 10 wherein said screen is affixed in laterally marginal portions thereof to said downwardly facing surfaces filter unit side members in closely spaced relation thereto.

12. The invention according to claim 11 and further including an elongated trim strip extending along said spaces between said sides and ends of adjacent filter units in covering relation to said caulking material rendering the latter nonvisible from a position below said filter units, and said trim strips extending along said sides are supported by marginal edges extending into the spaces between said screen and said side member downwardly facing surfaces.

13. The invention according to claim 7 wherein said end members are formed from aluminum extrusions.

14. A high efficiency air filtration system providing downward, laminar flow of filtered air into a clean space, said system comprising, in combination:
a) a plurality of individual filter units each including a filter core of pleated media sealed on four sides to a surrounding, box-like frame to provide upstream and downstream surfaces of said media;
b) said box-like frame of each of said units including a pair of end members and a pair of side member assembled in fluid-tight relation at mating corners, and enclosing said media to provide upstream and downstream edges of each of said end and side members;
c) a plurality of elongated track members supported in horizontal, parallel relation above said clean space and spaced by a predetermined distance;
d) a flange member having a downwardly facing terminal edge adjacent said upstream edges of each of said end members resting upon an upwardly facing support surface of a consecutive pair of said track members to provide the sole support means for said filter units;
e) said plurality of filter units being supported in closely spaced, side-by-side and end-to-end relation to one another, providing opposing vertical surfaces bordering the downstream edges of said side and end members of adjacent filter units; and
f) a caulking material providing an airtight seal between said opposing vertical surfaces, whereby the only path for air passing from above to below said filter units is through said media.

15. The invention according to claim 14 wherein said track members include structure defining at least one upwardly facing open channel extending along the full length of said track members, and having a bottom surface providing said support surface.

16. The invention according to claim 14 wherein said track members include structure defining a pair of upwardly facing channels extending in parallel relation along the full length of said track members, the bottom of said channels providing said support surface.

17. The invention according to claim 16 wherein said structure adjacent said upstream frame edges comprises flange members having portions extending outwardly and downwardly along said upstream edges of said end members, said downwardly extending portions having terminal edges resting upon said channel bottom surfaces, whereby said filter units are supported upon said track members with said downwardly extending flange portions of side-by-side units in the same channels of consecutive track members and those of end-to-end units in the two channels of the said track member.

18. The invention according to claim 17 wherein said vertical surfaces of the outer peripheral side and end members are positioned in closely spaced relation to an opposing vertical surface of an elongated member sealingly attached to a wall forming at least part of the structure enclosing said clean space, and a caulking material provides an airtight seal between said elongated member and the opposing vertical surfaces of said peripheral side and end members.

19. The invention according to claim 18 wherein said vertical surfaces bordering said downstream edges of said end members are defined by additional flange members extending along said downstream edges of said end members.

20. The invention according to claim 19 and further including elongated strips of material supported at said downstream edges of each of said filter units in covering relation to said caulking material, rendering the latter non-visible from below.

21. The invention according to claim 18 wherein said track members further include attachment means for connection to one another in end-to-end relation.

22. The invention according to claim 21 wherein said attachment means comprises openings extending into the ends of said track members and a rigid member secured in said openings of two end-adjacent track members to connect the latter in abutting relation.

* * * * *